US012327963B2

(12) United States Patent
Wang et al.

(10) Patent No.: US 12,327,963 B2
(45) Date of Patent: Jun. 10, 2025

(54) ELECTRICAL RECEPTACLE CONNECTOR WITH CENTRAL SHIELD

(71) Applicant: ADVANCED-CONNECTEK INC., New Taipei (TW)

(72) Inventors: Shu-Fen Wang, New Taipei (TW); Yu-Chai Yeh, New Taipei (TW); Guan-Lin Chen, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 400 days.

(21) Appl. No.: 17/889,955

(22) Filed: Aug. 17, 2022

(65) Prior Publication Data

US 2023/0057194 A1 Feb. 23, 2023

(30) Foreign Application Priority Data

Aug. 18, 2021 (TW) ........................... TW110209784

(51) Int. Cl.
*H01R 24/60* (2011.01)
*H01R 13/516* (2006.01)
*H01R 13/6471* (2011.01)
*H01R 107/00* (2006.01)

(52) U.S. Cl.
CPC ........... *H01R 24/60* (2013.01); *H01R 13/516* (2013.01); *H01R 13/6471* (2013.01); *H01R 2107/00* (2013.01)

(58) Field of Classification Search
CPC .................................................. H01R 13/6471
See application file for complete search history.

(56) References Cited

U.S. PATENT DOCUMENTS

| | | | | | |
|---|---|---|---|---|---|
| 4,687,267 | A * | 8/1987 | Header | H01R 12/725 439/62 |
| 9,281,643 | B1 * | 3/2016 | Tseng | H01R 13/518 |
| 10,122,124 | B2 * | 11/2018 | Daughtry, Jr. | H01R 13/405 |
| 10,439,308 | B2 * | 10/2019 | Ju | H01R 43/18 |

* cited by examiner

*Primary Examiner* — Neil Abrams
(74) *Attorney, Agent, or Firm* — Muncy, Geissler, Olds & Lowe, P.C.

(57) ABSTRACT

An electrical receptacle connector includes a metallic shell, an insulated housing in the metallic shell, a plurality of terminals at the insulated housing, and a metallic plate at the insulated housing. The terminals include two first terminal groups and two second terminal groups arranged in two rows, and the two rows are respectively arranged on the two faces of a tongue portion of the insulated housing. A length of each contact portion of each second terminal group is greater than a length of each contact portion of each first terminal group. The metallic plate is between the first terminal groups and the second terminal groups. The metallic plate has one or more extension portion between the contact portions of at least two adjacent terminals of one or more of the second terminal groups. The structural strength of the tongue portion can be improved by the extension portion.

13 Claims, 7 Drawing Sheets

ELECTRICAL RECEPTACLE CONNECTOR WITH CENTRAL SHIELD

CROSS-REFERENCE TO RELATED APPLICATION

This non-provisional application claims priority under 35 U.S.C. § 119(a) to Patent Application No. 110209784 in Taiwan, R.O.C. filed on Aug. 18, 2021, the entire contents of which are hereby incorporated by reference.

FIELD OF THE INVENTION

The instant disclosure relates to an electrical connector, and more particular to an electrical receptacle connector.

BACKGROUND

Generally, Universal Serial Bus (USB) is a serial bus standard to the PC architecture with a focus on computer interface, consumer and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing. The transmission rate of USB 2.0 is insufficient. As a consequence, faster serial bus interfaces such as USB 3.0, are developed, which may provide a higher transmission rate so as to satisfy the need of a variety devices.

SUMMARY OF THE INVENTION

The appearance, the structure, the contact ways of terminals, the number of terminals, the pitches between terminals (the distances between the terminals), and the pin assignment of terminals of a USB type-C electrical connector known to the inventor(s) are totally different from those of a USB electrical connector known to the inventor(s). When a user slantly inserts an electrical plug connector known to the inventor into an electrical receptacle connector known to the inventor, the tongue portion inside the electrical receptacle connector will be pushed by the components of the electrical plug connector and thus being damaged or broken easily.

In view of this, according to one or some embodiments, an electrical receptacle connector is provided. The electrical receptacle connector comprises a metallic shell, an insulated housing, a plurality of terminals, and a metallic plate. The metallic shell comprises a receiving cavity. The insulated housing is in the receiving cavity. The insulated housing comprises a base portion and a tongue portion extending outwardly from one side of the base portion. The terminals comprise a plurality of contact portion. The contact portions are at two faces of the tongue portion. The terminals comprise two first terminal groups and two second terminal groups. The first terminal groups and the second terminal groups are arranged in two rows, and the two rows are respectively arranged on the two faces of the tongue portion. A length of the contact portion of each of the second terminal groups is greater than a length of the contact portion of each of the first terminal groups. The metallic plate is at the tongue portion and between the first terminal groups and the second terminal groups. The metallic plate has at least one extension portion, and the at least one extension portion is between the contact portions of at least two adjacent terminals of at least one of the second terminal groups.

In some embodiments, each of the first terminal groups comprises a plurality of high-speed signal terminals and a plurality of low-speed signal terminals. The high-speed signal terminals are divided into two groups respectively at two outermost sides of the low-speed signal terminals. Each of the second terminal groups comprises a plurality of power terminals and a plurality of ground terminals. The ground terminals are at two outermost sides of the power terminals. The low-speed signal terminals are between the power terminals. In at least one of the two rows at the two faces of the tongue portion, each of the two groups of the high-speed signal terminals is between an adjacent one of the power terminals and an adjacent one of the ground terminals.

In some embodiments, the at least one extension portion is between the power terminals and corresponds to the low-speed signal terminals.

In some embodiments, the number of the extension portions of the metallic plate is plural, each of the extension portions is between an adjacent one of the power terminals and an adjacent one of the ground terminals, and the extension portions correspond to the low-speed signal terminals.

In some embodiments, the metallic plate comprises a plurality of extension portions, and the extension portions are between the power terminals. Each of the extension portions is between an adjacent one of the power terminals and an adjacent one of the ground terminals, and the extension portions correspond to the low-speed signal terminals and the high-speed signal terminals.

In some embodiments, the tongue portion has a front side surface and two side surfaces, the front side surface is connected to front side portions of the two faces, and the two side surfaces are connected to two sides of the two faces. Each of two sides of the at least one metallic plate has a buckling portion, and each of the buckling portions of the at least one metallic plate protrudes from a corresponding one of the two side surfaces. A front end of the contact portion of each of the second terminal groups is nearer to the front side surface of the tongue portion, and a front end of the contact portion of each of the first terminal groups is farer from the front side surface of the tongue portion.

In some embodiments, each of the two sides of the at least one metallic plate has a first recessed portion, each of the first recessed portions is between the at least one extension portion and an adjacent one of the buckling portions, and the first recessed portions correspond to the ground terminals. The first recessed portions are recessed toward the base portion. An end portion of each of the ground terminals at one of the two faces of the tongue portion faces an end portion of a corresponding one of the ground terminals at the other face of the tongue portion through a corresponding one of the first recessed portions.

In some embodiments, the at least one extension portion extends toward the front side surface and is at the tongue portion.

In some embodiments, the number of the extension portions of the metallic plate is plural, and the metallic plate comprises an indentation portion between the extension portions and between the power terminals. The indentation portion is recessed toward the base portion. An end portion of each of the power terminals at one of the two faces of the tongue portion faces an end portion of a corresponding one of the power terminals at the other face of the tongue portion through the indentation portion.

In some embodiments, each of two sides of the metallic plate has a connection portion, and the connection portions are at the base portion.

In some embodiments, the indentation portion is a large cutout at a front edge of the metallic plate.

Based on the above, according to one or some embodiments of the instant disclosure, the extension portion extends from the metallic plate and at the tongue portion. Therefore, the structural strength of the tongue portion can be enhanced. Hence, when an electrical plug connector is slantly inserted into the electrical receptacle connector, the tongue portion can be supported by the extension portion, and the electrical plug connector in the slanting orientation can be prevented from damaging the tongue portion upon the electrical plug connector hits the tongue portion. In some embodiments, the metallic plate has the indentation portion, such that plastic materials can be filled through the hollow region of the indentation portion to form the entire tongue portion, thereby increasing the molding efficiency as well as reducing the condition that front ends of the contact portions of the terminals are not properly covered by the tongue portion (the short shot condition of the plastic materials).

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
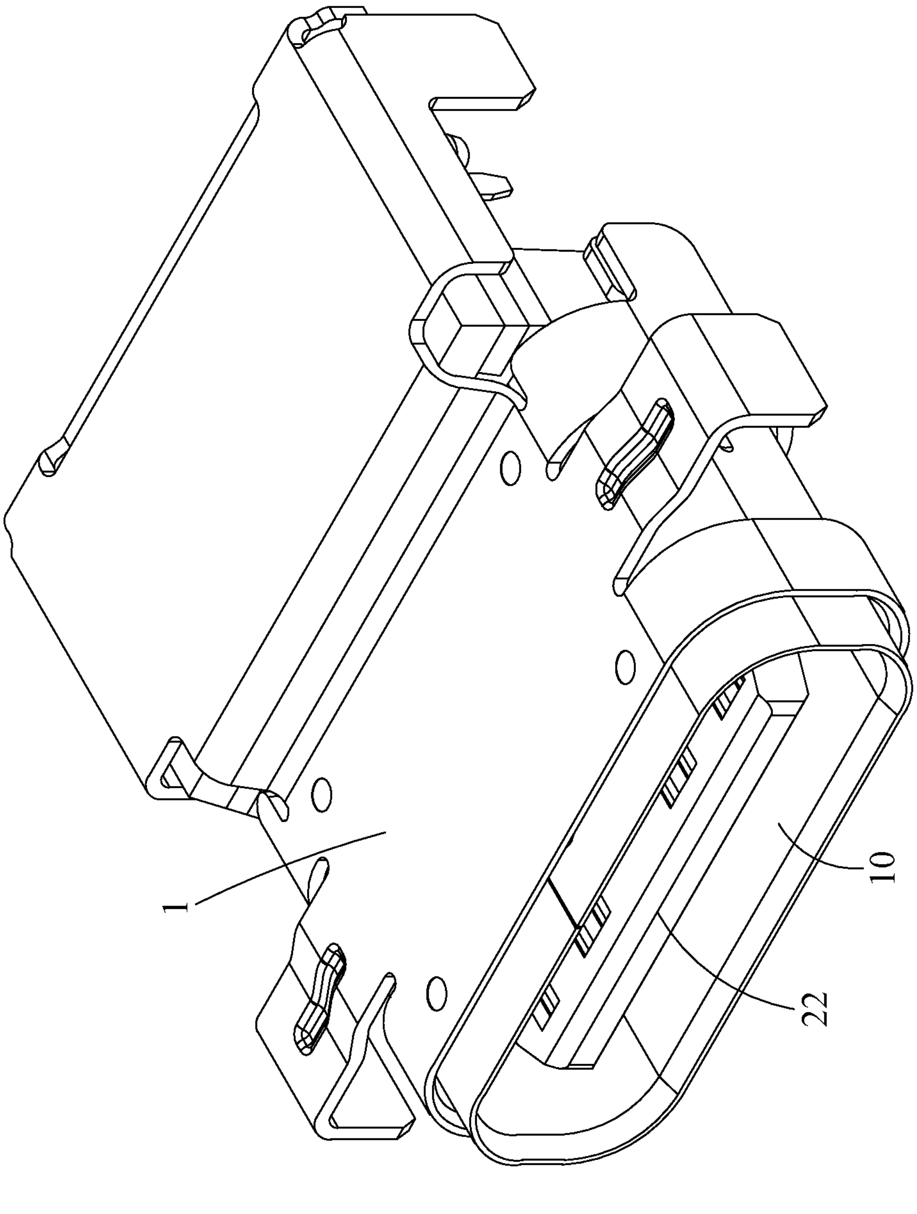
FIG. 1 illustrates a perspective view of an electrical receptacle connector according to some embodiments of the instant disclosure.
Figure 2:
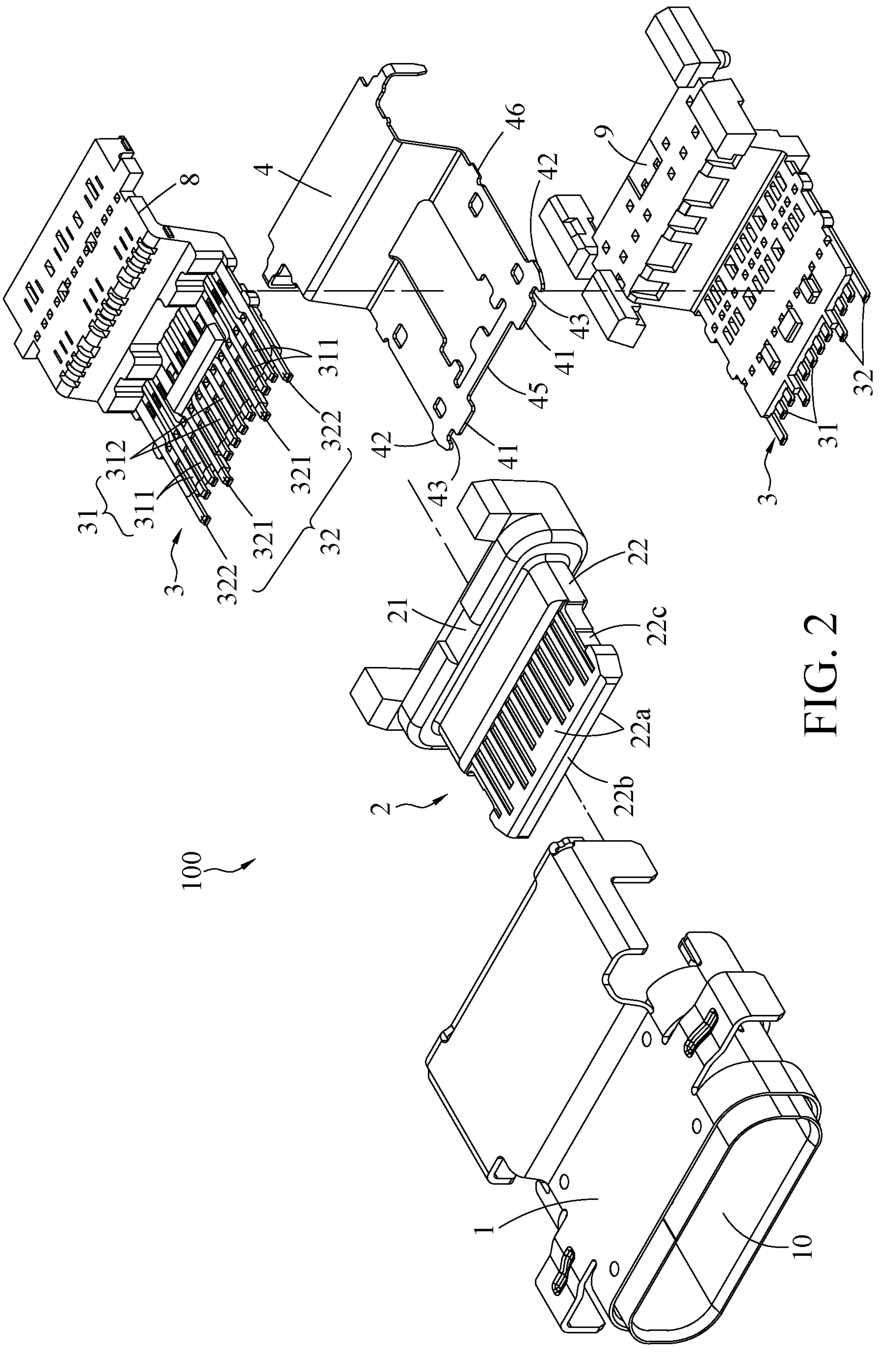
FIG. 2 illustrates an exploded view of the electrical receptacle connector according to some embodiments of the instant disclosure.

Please refer to FIG. 1 and FIG. 2. FIG. 1 illustrates a perspective view of an electrical receptacle connector 100 according to some embodiments of the instant disclosure. FIG. 2 illustrates an exploded view of the electrical receptacle connector 100 according to some embodiments of the instant disclosure. In some embodiments, the electrical receptacle connector 100 is in accordance with the specification of USB type-C connection interfaces. In this embodiment, the electrical receptacle connector 100 comprises a metallic shell 1, an insulated housing 2, a plurality of terminals 3, and a metallic plate 4.

Figure 3:
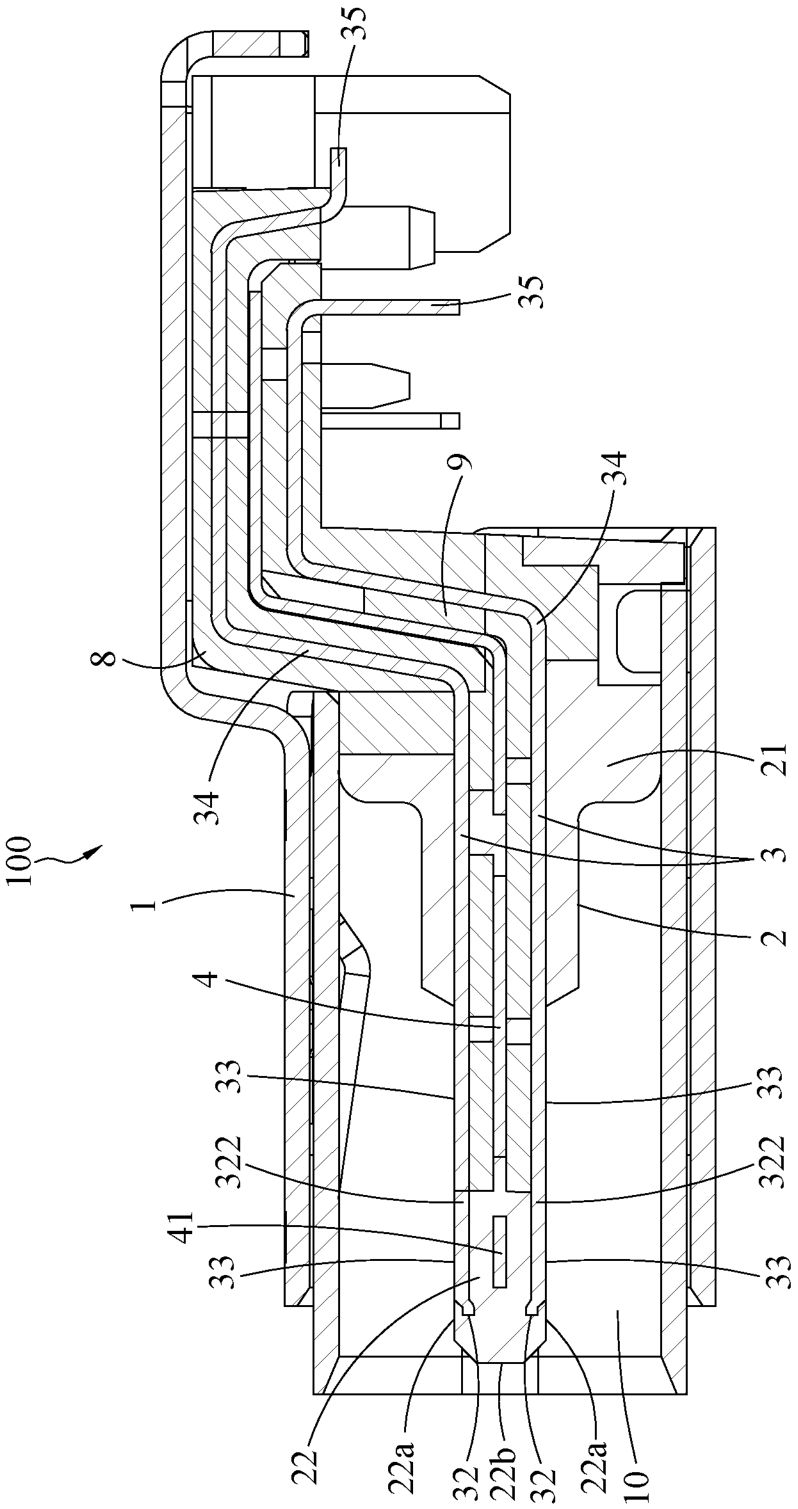
FIG. 3 illustrates a cross-sectional view of the electrical receptacle connector according to some embodiments of the instant disclosure.
Figure 6:
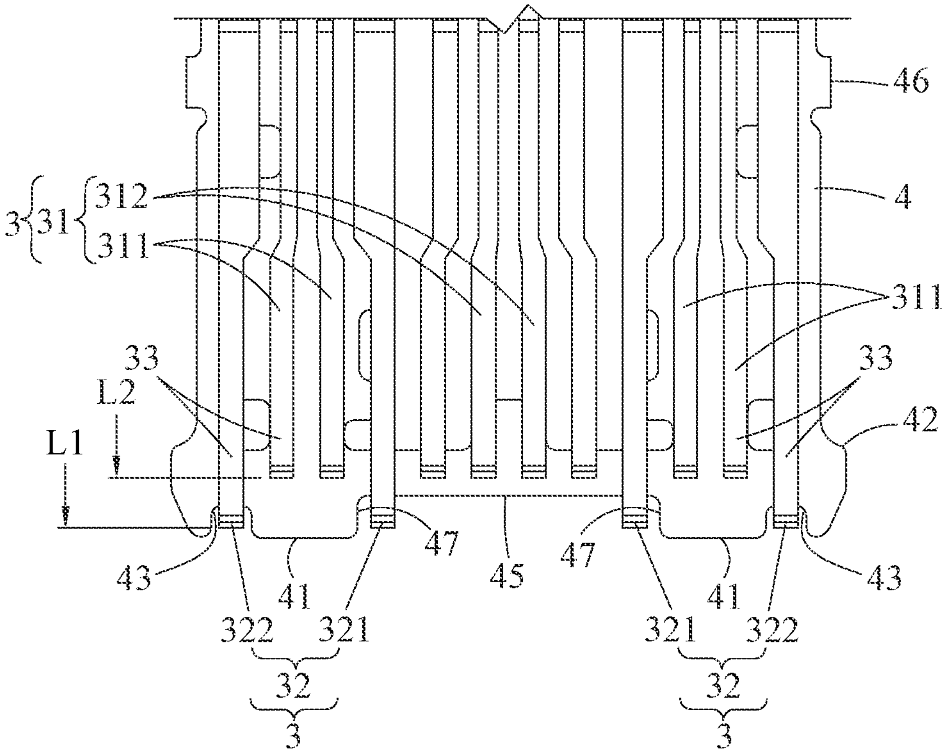
FIG. 6 illustrates a partial top view of terminals and a metallic plate of the electrical receptacle connector from the viewing angle of FIG. 5, where the left portion and the right portion of the metallic plate have extension portions.

Please refer to FIG. 2 and FIG. 3. FIG. 3 illustrates a cross-sectional view of the electrical receptacle connector 100 according to some embodiments of the instant disclosure. In this embodiment, the metallic shell 1 is a hollow shell and has a receiving cavity 10. The insulated housing 2 is in the receiving cavity 10. The insulated housing 2 has a base portion 21 and a tongue portion 22 extending from one side of the base portion 21. The terminals 3 have a plurality of contact portions 33. The contact portions 33 are at two faces 22*a* of the tongue portion 22. The terminals 3 comprise two first terminal groups 31 and two second terminal groups 32. The first terminal groups 31 and the second terminal groups 32 are arranged in two rows, and the two rows are respectively arranged on the two faces 22*a* of the tongue portion 22 (as shown in FIG. 3). A length L1 of the contact portion 33 of each of the two second terminal groups 32 is greater than a length L2 of the contact portion 33 of each of the two first terminal groups 31 (as shown in FIG. 6). The metallic plate 4 is at the tongue portion 22 and between the first terminal groups 31 and the second terminal groups 32. The metallic plate 4 has at least one extension portion 41, and the at least one extension portion 41 is between the contact portions 33 of at least two adjacent terminals 3 of at least one of the second terminal groups 32.

Figure 7:
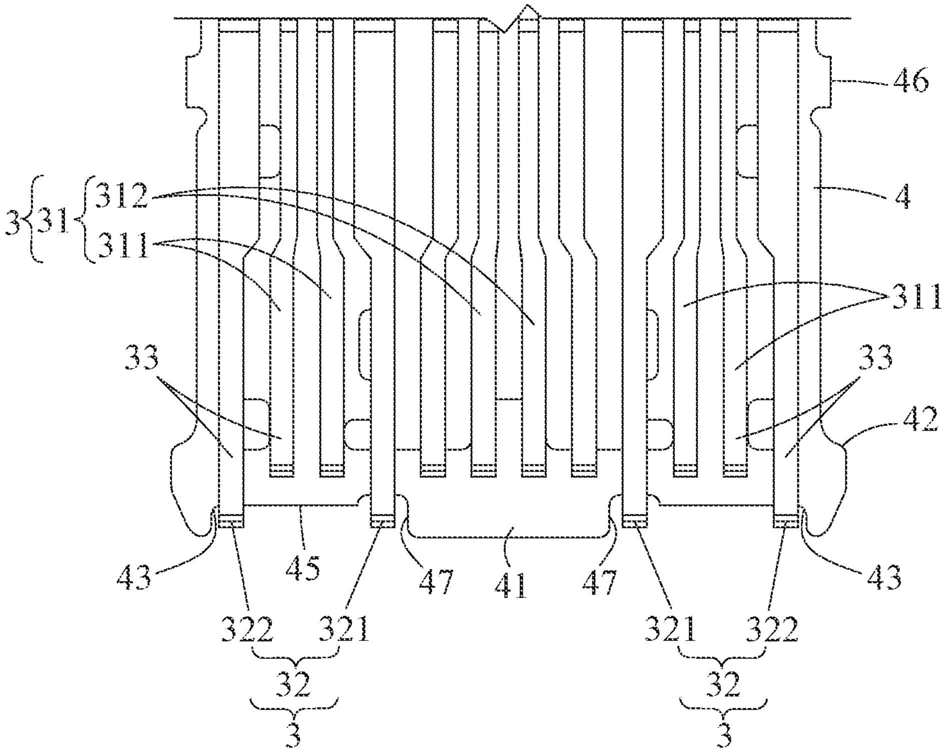
FIG. 7 illustrates a partial top view of terminals and a metallic plate of the electrical receptacle connector from the viewing angle of FIG. 5, where the middle portion of the metallic plate has an extension portion.

Based on the above, according to one or some embodiments of the instant disclosure, the extension portion 41 (which may be one extension portion 41 as shown in FIG. 7 or several extension portions 41 as shown in FIG. 6) extends from the metallic plate 4 and at the tongue portion 22. Therefore, the structural strength of the tongue portion 22 can be enhanced. Hence, when an electrical plug connector is slantly inserted into the electrical receptacle connector 100, the tongue portion 22 can be supported by the extension portion(s) 41, and the electrical plug connector in the slanting orientation can be prevented from damaging or breaking the tongue portion 22 upon the electrical plug connector hits the tongue portion 22.

Figure 5:
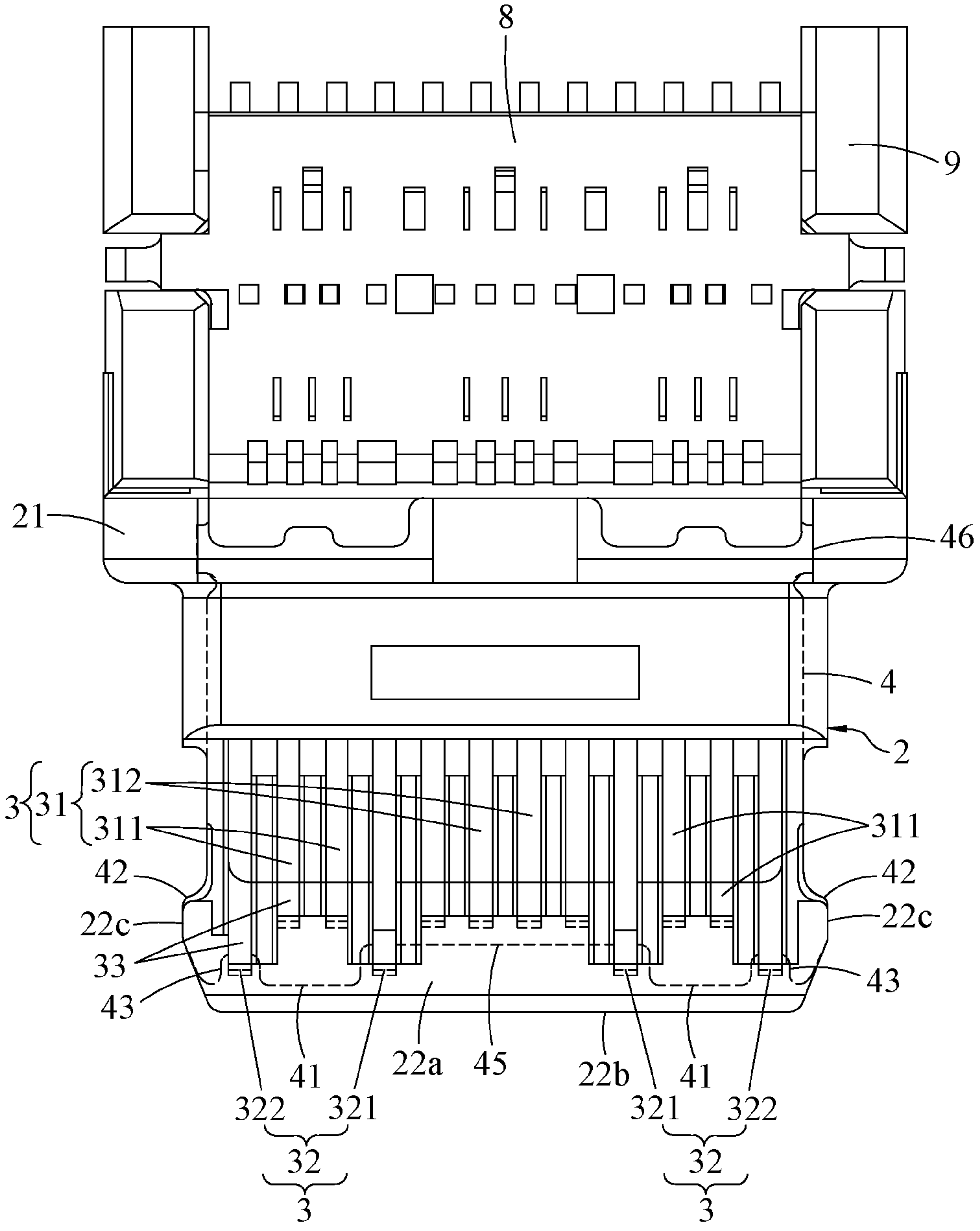
FIG. 5 illustrates a top view of a terminal module of the electrical receptacle connector according to some embodiments of the instant disclosure.

In some embodiments, taking the front side surface 22*b* of the tongue portion 22 as a reference surface, a front end of the contact portion 33 of each of the second terminal groups 32 is nearer to the front side surface 22*b*, and a front end of the contact portion 33 of each of the first terminal groups 31 is farer from the front side surface 22*b* (as shown in FIG. 5). As mentioned above, the length L1 of the contact portion 33 of each of the second terminal groups 32 is greater than the length L2 of the contact portion 33 of each of the two first terminal groups 31, and the length L2 of the contact portion 33 of each of the first terminal groups 31 is greater than the length L1 of the contact portion 33 of each of the second terminal groups 32. The front end of the contact portion 33 of each of the terminals 3 is covered by the tongue portion 22 (as shown in FIG. 3), and an upper surface or a lower surface of each of the contact portions 33 is exposed from the two faces 22*a* of the tongue portion 22.

Please refer to FIG. 2 and FIG. 3. In this embodiment, the terminals 3 at the upper row and a first insulated member 8 are formed with each other by insert-molding to form a first part, and the terminals 3 at the lower row and a second insulated member 9 are formed with each other by insert-molding, and then the metallic plate 4 is assembled on the second insulated member 9 to form a second part. Then, the first part and the second part are combined with each other, and the insulated housing 2 is combined with an assembly of the first part and the second part.

Figure 4:
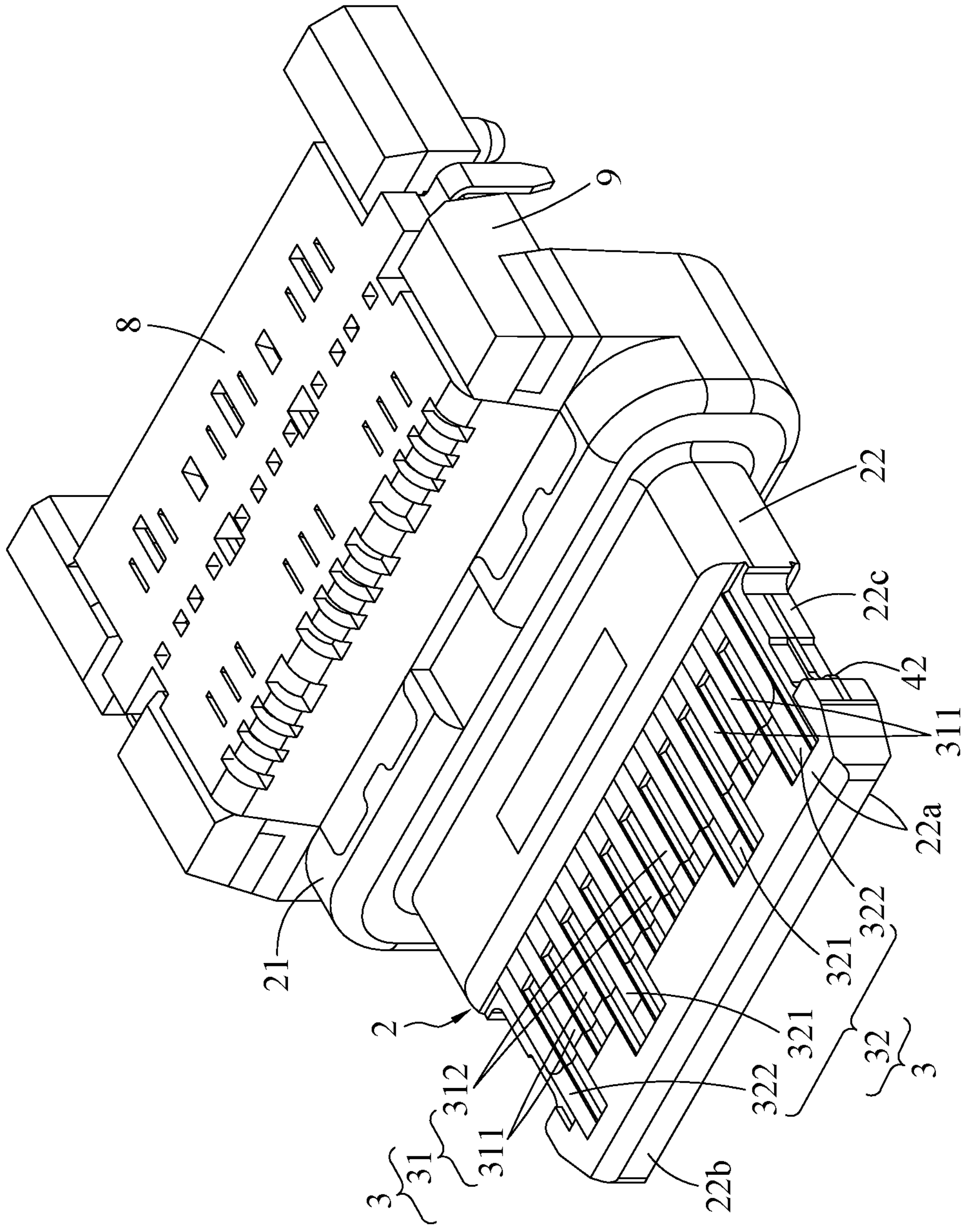
FIG. 4 illustrates a perspective view of a terminal module of the electrical receptacle connector according to some embodiments of the instant disclosure.

Please refer to FIG. 2 and FIG. 4. FIG. 4 illustrates a perspective view of a terminal module of the electrical receptacle connector according to some embodiments of the instant disclosure. In some embodiments, each of the first terminal groups 31 comprises a plurality of high-speed signal terminals 311 and a plurality of low-speed signal terminals 312. The high-speed signal terminals 311 are divided into two groups respectively at two outermost sides of the low-speed signal terminals 312. Each of the second terminal groups 32 comprises a plurality of power terminals 321 and a plurality of ground terminals 322. The ground terminals 322 are at two outermost sides of the power terminals 321. The low-speed signal terminals 312 are between the power terminals 321. In at least one of the two rows at the two faces 22*a* of the tongue portion 22, each of the two groups of the high-speed signal terminals 311 is between an adjacent one of the power terminals 321 and an adjacent one of the ground terminals 322.

Please refer to FIG. 2 to FIG. 4. In some embodiments, the first terminal group 31 at one of the two faces 22*a* of the tongue portion 22 has four high-speed signal terminals 311 and two low-speed signal terminals 312, and the first terminal group 31 at the other face 22*a* of the tongue portion 22 has four high-speed signal terminals 311 and two low-speed signal terminals 312. Moreover, in some embodiments, the second terminal group 32 at one of the two faces 22*a* of the tongue portion 22 has two power terminals 321 and two ground terminals 322, and the second terminal group 32 at the other face 22*a* of the tongue portion 22 has two power terminals 321 and two ground terminals 322.

Please refer to FIG. 5 and FIG. 6. FIG. 5 illustrates a top view of a terminal module of the electrical receptacle connector according to some embodiments of the instant disclosure. FIG. 6 illustrates a partial top view of terminals 3 and a metallic plate 4 of the electrical receptacle connector from the viewing angle of FIG. 5, where the left portion and the right portion of the metallic plate 4 have extension portions 41. In some embodiments, the metallic plate 4 comprises a plurality of extension portions 41. The extension portion 41 extends toward the front side surface 22*b* of the tongue portion 22 but is not exposed from the front side surface 22*b* of the tongue portion 22. Each of the extension portions 41 is between an adjacent one of the power terminals 321 and an adjacent one of the ground terminals 322. The extension portions 41 correspond to the high-speed signal terminals 312. As shown in FIG. 6, several extension portions 41 are at the left portion and the right portion of the lower portion of the metallic plate 4. Specifically, in this embodiment, the extension portions 41 are at the right portion and the left portion of the metallic plate 4 to support the two sides of the tongue portion 22. Therefore, when an electrical plug connector is slantly inserted into the electrical receptacle connector 100, for example, along a lower-left to upper-right direction or along a lower-right to upper-left direction, the structural strength at the two sides of the tongue portion 22 can be reinforced by the extension portions 41. Hence, the electrical plug connector in the slanting orientation can be prevented from damaging or breaking the tongue portion 22 upon the electrical plug connector hits the two sides of the tongue portion 22.

Please refer to FIG. 5 and FIG. 6. In some embodiments, from a viewing angle perpendicular to the tongue portion 22 as shown in FIG. 5, the extension portions 41 are between the contact portions 33 of four adjacent terminals 3 of the second terminal group 33 at one of the two faces 22*a* of the tongue portion 22. In some embodiments, in the case that the metallic plate 4 has one extension portion 41, one of the extension portions 41 shown in FIG. 5 can be omitted. Moreover, in some embodiments, in the case that the metallic plate 4 has at least one extension portion 41, from a viewing angle perpendicular to the tongue portion 22 as shown in FIG. 5, the at least one extension portion 41 is between the contact portions 33 of at least two adjacent terminals 3 of the second terminal group 32 at one of the two faces 522*a* of the tongue portion 22.

Please refer to FIG. 7. FIG. 7 illustrates a partial top view of terminals 3 and a metallic plate 4 of the electrical receptacle connector 100 from the viewing angle of FIG. 5, where the middle portion of the metallic plate 4 has an extension portion 41. In some embodiments, at least one extension portion 41 is between the power terminals 321 and corresponds to the low-speed signal terminals 312. As shown in FIG. 7, an extension portion 41 is at a middle portion of the lower portion of the metallic plate 4. At least one extension portion 41 extends toward the front side surface 22*b* of the tongue portion 22 (as shown in FIG. 5) and is at the tongue portion 22, and at least one extension portion 41 is not exposed from the front side surface 22*b* of the tongue portion 22.

Figure 8:
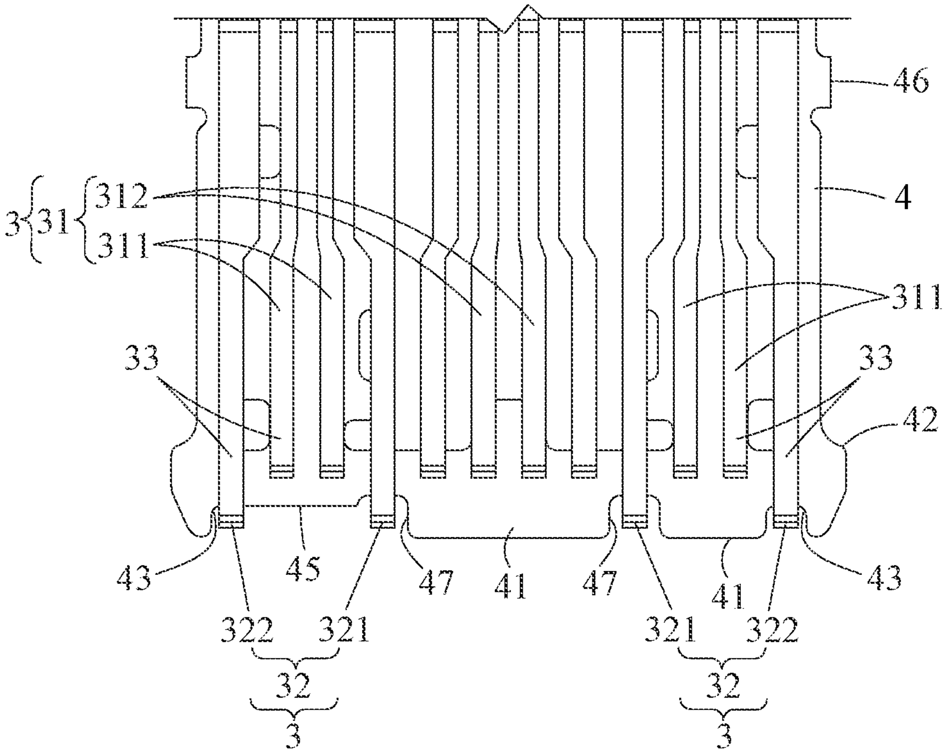
FIG. 8 illustrates a partial top view of terminals and a metallic plate of the electrical receptacle connector from the viewing angle of FIG. 5, where the middle portion and the right portion of the metallic plate have extension portions.
Figure 9:
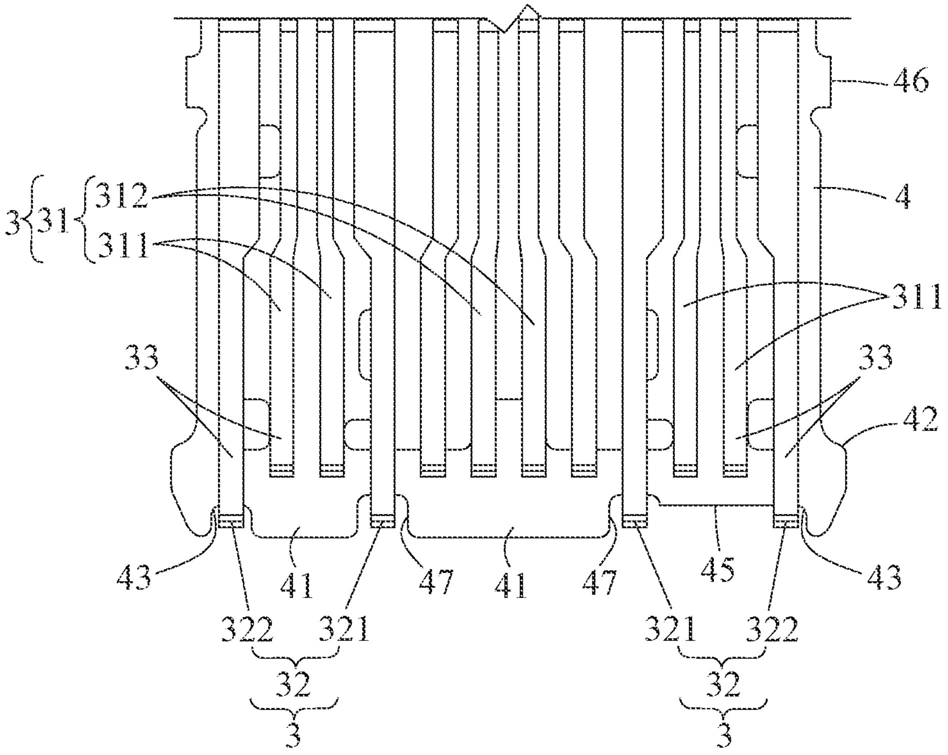
FIG. 9 illustrates a partial top view of terminals and a metallic plate of the electrical receptacle connector from the viewing angle of FIG. 5, where the middle portion and the left portion of the metallic plate have extension portions.

Please refer to FIG. 8 and FIG. 9. FIG. 8 illustrates a partial top view of terminals 3 and a metallic plate 4 of the electrical receptacle connector 100 from the viewing angle of FIG. 5, where the middle portion and the right portion of the metallic plate 4 have extension portions 41. FIG. illustrates a partial top view of terminals 3 and a metallic plate 4 of the electrical receptacle connector 100 from the viewing angle of FIG. 5, where the middle portion and the left portion of the metallic plate 4 have extension portions 41. In some embodiments, the metallic plate 4 comprises a plurality of extension portions 41. The extension portions 41 are between the power terminals 321, and each of the extension portions 41 is between an adjacent one of the power terminals 321 and an adjacent one of the ground terminals 322. The extension portions 41 correspond to the low-speed signal terminals 312 and the high-speed signal terminals 311. As shown in FIG. 8, in one embodiment, several extension portions 41 are at the middle portion and the right portion of the lower portion of the metallic plate 4; alternatively, as shown in FIG. 9, in one embodiment, several extension portions 41 are at the middle portion and the left portion of the lower portion of the metallic plate 4, but embodiments are not limited thereto. In some embodiments, the number of the extension portions 41 may be three, and the three extension portions 41 are at the middle portion, the right portion, and the left portion of the lower portion of the metallic plate 4. The extension portions 4 support the two sides or the middle portion of the tongue portion 22. Hence, when an electrical plug connector is inserted into the electrical receptacle connector 100 with an improper orientation, the structural strength the tongue portion 22 can be reinforced by the extension portions 41. Hence, the electrical plug connector in an improper slanting orientation can be prevented from damaging or breaking the tongue portion 22 upon the electrical plug connector hits the tongue portion 22 of the electrical receptacle connector 100.

Please refer to FIG. 3 to FIG. 5. In some embodiments, the tongue portion 22 has a front side surface **22*b* and two side surfaces 22*c*. The front side surface 22*b* is connected to front side portions of the two faces 22*a*, and the two side surfaces 22*c* are connected to two sides of the two faces 22*a*. Each of two sides of the extension portion 4 has a buckling portion 42, and each of the buckling portions 42 protrudes from a corresponding one of the two side surfaces 22*c*. In some embodiments, the area of the metallic plate 4 is extended in length and width to correspond to the entire tongue portion 22. The lower portion of the metallic plate 4 is adjacent to the front side surface 22*b* of the tongue portion 22 (as shown in FIG. 5). Therefore, the metallic plate 4 can increase the structural strength of the tongue portion 22. The buckling portions 42 at the two sides of the metallic plate 4 protrude from two sides of the tongue portion 22 so as to be buckled by hooks of an electrical plug connector. Therefore, when an electrical plug connector is inserted into the electrical receptacle connector 100, owing to the buckling portions 42, the buckling pieces at the two sides of the electrical plug connector can be prevented from wearing against the two sides of the tongue portion 22 to cause the wearing and damaging of the tongue portion 22**.

Please refer to FIG. 2, FIG. 5, and FIG. 6. In some embodiments, each of the two sides of the metallic plate 4 has a first recessed portion 43, and each of the first recessed portions 43 is between an adjacent one extension portion 41 and an adjacent one of the buckling portions 42. The first recessed portions 43 correspond to the ground terminals 4. The first recessed portions 43 are recessed toward the base portion 21. An end portion of each of the ground terminals 322 at one of the two faces **22*a* of the tongue portion 22 faces an end portion of a corresponding one of the ground terminals 322 at the other face 22*a* of the tongue portion 22 through a corresponding one of the first recessed portions 43. As shown in FIG. 3, an end portion of the ground terminal 322 at the upper row of the tongue portion 22 faces an end portion of the ground terminals 322 at the lower row of the tongue portion 22**.

Please refer to FIG. 2, FIG. 5, and FIG. 6. In some embodiments, the number of the extension portions 41 of the metallic plate 4 is plural, and the metallic plate 4 comprises an indentation portion 45 between the extension portions 41 and between the power terminals 321. The indentation portion 45 is recessed toward the base portion 21. The indentation portion 45 is a large cutout at a front edge of the metallic plate 4. An end portion of each of the power terminals 321 at one of the two faces **22*a* of the tongue portion 22 faces an end portion of a corresponding one of the power terminals 321 at the other face 22*a* of the tongue portion 22 through the indentation portion 45. For example, upon the ground terminals 322 shown in FIG. 3 are replaced with the power terminals 321, an end portion of the power terminal 321 at the upper row of the tongue portion 22 faces an end portion of the power terminal 321 at the lower row of the tongue portion 22. When the metallic plate 4 and the insulated housing 2 are inserted molded in the mold, plastic materials are filled into the mold, and the plastic materials can be filled through the hollow region of the indentation portion 45 to form the entire tongue portion 22, thereby increasing the molding efficiency as well as reducing the condition that front ends of the contact portions 33 are not properly covered by the tongue portion 22** (the short shot condition of the plastic materials).

In some embodiments, in the case that the tongue portion 22 does not cover the front ends of the contact portions 33, the plastic materials cannot be properly filled through the hollow region of the indentation portion 45 to form the tongue portion 22 (a possible scenario is that the region of the indentation portion 45 is not large enough). As a result, the efficiency for filling the plastic materials for forming the tongue portion 22 is reduced, and the front ends of the contact portions 33 of the terminals 3 are not covered by the tongue portion 22 and are exposed. Consequently, upon terminals of an electrical plug connector is mated with the contact portions 33 of the electrical receptacle connector 100, the contact portions 33 are prone to be deflected upwardly to cause an improper mating between the terminals of the electrical plug connector and the terminals 3 of the electrical receptacle connector 100. Moreover, since the contact portions 33 are prone to be deflected upwardly, the contact portions 33 may be in contact with each other to cause short circuit condition.

Please refer to FIG. 5. In some embodiments, each of the two sides of the metallic plate 4 has a connection portion 46, and the connection portions 46 are at the base portion 21. In this embodiment, the metallic plate 4 is connected to a material belt through the connection portions 46, and the connection portions 46 are not at the tongue portion 22. Please refer to FIGS. 6 to 9, the metallic plate 4 has second recessed portions 47. Each of the second recessed portions 47 is between one of the at least one of the extension portions 41 and the at least one of indentation portion 45, or between the extension portions 41. In addition, the second recessed portions 47 correspond to the power terminals 321, and the second recessed portions 47 are recessed toward the base portion 21. An end portion of each of the power terminals 321 at one of the two faces of the tongue portion 22 faces an end portion of a corresponding one of the power terminals 321 at the other face of the tongue portion 22 through a corresponding one of the second recessed portions 47.

Please refer to FIG. 2 and FIG. 3. In some embodiments, the metallic shell 1 is a multi-piece structure. The metallic shell 1 comprises an inner shell and a cover plate. The inner shell is a tubular structure and is fitted over the insulated housing 2. The cover plate is fitted over the inner shell, but embodiments are not limited thereto. In some embodiments, the metallic shell 1 may be a unitary element.

Please refer to FIG. 2 and FIG. 3. In some embodiments, the terminals 3 comprise body portions 34 and tail portions 35. The body portions 34 are held at the first insulated member 8 or the second insulated member 9. Each of the contact portions 33 extends from one of two ends of a corresponding one of the body portions 34 and at one or the other of the two faces **22*a* of the tongue portion 22. Each of the tail portions 35 extends from the other end of a corresponding one of the body portions 34 and protrudes from a rear portion of the first insulated member 8 or a rear portion of the second insulated member 9. The tail portions 35** are aligned horizontally to form flat legs (SMT (surface mount technology) legs which can be soldered or mounted on the surface of a circuit board using surface mount technology) and vertical legs (through-hole legs which can be soldered on the surface of a circuit board by through hole technology).

Please refer to FIG. 2 and FIG. 3. In some embodiments, the pin arrangement of the terminals 3 at the upper row of the tongue portion 22 shown in FIG. 2 is, from left to right, a ground terminal 322 (Gnd), a first pair of high-speed signal terminals 311 (TX1+−, differential signal terminals for high-speed signal transmission), a power terminals 321 (Power/VBUS), a function detection terminal (CC1, a terminal for inserting orientation detection of the connector and for cable recognition), a pair of low-speed signal terminals 312 (D+−, differential signal terminals for low-speed signal transmission), a reserved terminal (SBU1, which may be defined to provide other purposes), another power terminal 321 (Power/VBUS), a second pair of high-speed signal terminals 311 (RX2+−, differential signal terminals for high-speed signal transmission), and another ground terminal 322 (Gnd). In this embodiment, twelve terminals 3 are provided at the upper row of the tongue portion 22 for transmitting USB 3.0 signals.

Please refer to FIG. 2 and FIG. 3. In some embodiments, the pin arrangement of the terminals 3 at the lower row of the tongue portion 22 shown in FIG. 2 is, from right to left, a ground terminal 332 (Gnd), a first pair of high-speed signal terminals 311 (TX2+−, differential signal terminals for high-speed signal transmission), a power terminals 321 (Power/VBUS), a function detection terminal (CC2, a terminal for inserting orientation detection of the connector and for cable recognition), a pair of low-speed signal terminals 312 (D+−, differential signal terminals for low-speed signal transmission), a reserved terminal (SBU2, which may be defined to provide other purposes), another power terminal 321 (Power/VBUS), a second pair of high-speed signal terminals 311 (RX1+−, differential signal terminals for high-speed signal transmission), and another ground terminal 322 (Gnd). In this embodiment, twelve terminals 3 are provided at the lower row of the tongue portion 22 for transmitting USB 3.0 signals.

In some embodiments, the metallic plate 4 has several pins extending from two sides of the rear portion of the metallic plate 4 to form vertical legs. In some embodiments, when signals are transmitted between the terminals of the electrical plug connector and the terminals 3 of the electrical receptacle connector 100, the terminals 3 of the electrical receptacle connector 100 can be isolated from each other by the metallic plate 4 to reduce the crosstalk signal interferences upon signal transmission. Moreover, the pins are provided for connecting to a circuit board for conduction and grounding. The metallic plate 4 is at the tongue portion 22 to increase the structural strength of the tongue portion 22.

Based on the above, according to one or some embodiments of the instant disclosure, the extension portion extends from the metallic plate and at the tongue portion. Therefore, the structural strength of the tongue portion can be enhanced. Hence, when an electrical plug connector is slantly inserted into the electrical receptacle connector, the tongue portion can be supported by the extension portion, and the electrical plug connector in the slanting orientation can be prevented from damaging the tongue portion upon the electrical plug connector hits the tongue portion. In some embodiments, the metallic plate has the indentation portion, such that plastic materials can be filled through the hollow region of the indentation portion to form the entire tongue portion, thereby increasing the molding efficiency as well as reducing the condition that front ends of the contact portions of the terminals are not properly covered by the tongue portion (the short shot condition of the plastic materials).

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical receptacle connector, comprising:

a metallic shell comprising a receiving cavity;

an insulated housing in the receiving cavity, wherein the insulated housing comprises a base portion and a tongue portion extending outwardly from one side of the base portion;

a plurality of terminals comprising a plurality of contact portions, wherein the contact portions are at two faces of the tongue portion; the terminals comprise two first terminal groups and two second terminal groups; the first terminal groups and the second terminal groups are arranged in two rows, and the two rows are respectively arranged on the two faces of the tongue portion; a length of the contact portion of each of the second terminal groups is greater than a length of the contact portion of each of the first terminal groups, wherein each of the first terminal groups comprises a plurality of high-speed signal terminals and a plurality of low-speed signal terminals; the high-speed signal terminals are divided into two groups respectively at two outermost sides of the low-speed signal terminals; each of the second terminal groups comprises a plurality of power terminals and a plurality of ground terminals; the ground terminals are at two outermost sides of the power terminals, the low-speed signal terminals are between the power terminals; in at least one of the two rows at the two faces of the tongue portion, each of the two groups of the high-speed signal terminals is between an adjacent one of the power terminals and an adjacent one of the ground terminals; and a metallic plate at the tongue portion and between the first terminal groups and the second terminal groups, wherein the metallic plate has at least one extension portion and at least one indentation portion, and the at least one extension portion is located between the contact portions of the power terminals, and the at least one indentation portion is recessed toward the base portion and located between power terminals and the ground terminals.

2. The electrical receptacle connector according to claim 1, wherein the at least one extension portion is between the power terminals and corresponds to the low-speed signal terminals.

3. The electrical receptacle connector according to claim 1, wherein the metallic plate comprises a plurality of extension portions, and one of the extension portions is located between the power terminals; another extension portion is located between an adjacent one of the power terminals and an adjacent one of the ground terminals, and the extension portions respectively correspond to the low-speed signal terminals and the high-speed signal terminals.

4. The electrical receptacle connector according to claim 1, wherein the tongue portion has a front side surface and two side surfaces, the front side surface is connected to front side portions of the two faces, and the two side surfaces are connected to two sides of the two faces; each of two sides of the at least one metallic plate has a buckling portion, and each of the buckling portions of the at least one metallic plate protrudes from a corresponding one of the two side surfaces; a front end of the contact portion of each of the second terminal groups is nearer to the front side surface of the tongue portion, and a front end of the contact portion of each of the first terminal groups is farer from the front side surface of the tongue portion.

5. The electrical receptacle connector according to claim 4, wherein the metallic plate comprises a plurality of extension portions, and one of the extension portions is located between the power terminals; another extension portion is located between an adjacent one of the power terminals and an adjacent one of the ground terminals, and the extension portions respectively correspond to the low-speed signal terminals and the high-speed signal terminals; one of the two sides of the at least one metallic plate has a first recessed portion, each of the first recessed portions is between the at least one extension portion and an adjacent one of the buckling portions, and the first recessed portions correspond to the ground terminals; the first recessed portions are recessed toward the base portion; an end portion of each of the ground terminals at one of the two faces of the tongue portion faces an end portion of a corresponding one of the ground terminals at the other face of the tongue portion through a corresponding one of the first recessed portions.

6. The electrical receptacle connector according to claim 4, wherein the at least one extension portion extends toward the front side surface and is at the tongue portion.

7. An electrical receptacle connector, comprising:

a metallic shell comprising a receiving cavity;

an insulated housing in the receiving cavity, wherein the insulated housing comprises a base portion and a tongue portion extending outwardly from one side of the base portion;

a plurality of terminals comprising a plurality of contact portions, wherein the contact portions are at two faces of the tongue portion; the terminals comprise two first terminal groups and two second terminal groups; the first terminal groups and the second terminal groups are arranged in two rows, and the two rows are respectively arranged on the two faces of the tongue portion; a length of the contact portion of each of the second terminal groups is greater than a length of the contact portion of each of the first terminal groups, wherein each of the first terminal groups comprises a plurality of high-speed signal terminals and a plurality of low-speed signal terminals; the high-speed signal terminals are divided into two groups respectively at two outermost sides of the low-speed signal terminals; each of the second terminal groups comprises a plurality of power terminals and a plurality of ground terminals; the ground terminals are at two outermost sides of the power terminals, the low-speed signal terminals are between the power terminals; in at least one of the two rows at the two faces of the tongue portion, each of the two groups of the high-speed signal terminals is between an adjacent one of the power terminals and an adjacent one of the ground terminals; and a metallic plate at the tongue portion and between the first terminal groups and the second terminal groups, wherein the metallic plate has a plurality of extension portions and an indentation portion, wherein each of the extension portions is between an adjacent one of the power terminals and an adjacent one of the ground terminals, and the extension portions correspond to the high-speed signal terminals, and the indentation portion between the extension portions and between the power terminals; the indentation portion is recessed toward the base portion; an end portion of each of the power terminals at one of the two faces of the tongue portion faces an end portion of a corresponding one of the power terminals at the other face of the tongue portion through the indentation portion.

8. The electrical receptacle connector according to claim 1, wherein each of two sides of the metallic plate has a connection portion, and the connection portions are at the base portion.

9. The electrical receptacle connector according to claim 1, wherein the indentation portion is a large cutout at a front edge of the metallic plate.

10. The electrical receptacle connector according to claim 7, wherein the tongue portion has a front side surface and two side surfaces, the front side surface is connected to front side portions of the two faces, and the two side surfaces are connected to two sides of the two faces; each of two sides of the at least one metallic plate has a buckling portion, and each of the buckling portions of the at least one metallic plate protrudes from a corresponding one of the two side surfaces; a front end of the contact portion of each of the second terminal groups is nearer to the front side surface of the tongue portion, and a front end of the contact portion of each of the first terminal groups is farer from the front side surface of the tongue portion.

11. The electrical receptacle connector according to claim 10, wherein each of the two sides of the at least one metallic plate has a first recessed portion, each of the first recessed portions is between the at least one extension portion and an adjacent one of the buckling portions, and the first recessed portions correspond to the ground terminals; the first recessed portions are recessed toward the base portion; an end portion of each of the ground terminals at one of the two faces of the tongue portion faces an end portion of a corresponding one of the ground terminals at the other face of the tongue portion through a corresponding one of the first recessed portions.

12. The electrical receptacle connector according to claim 11, wherein the metallic plate has second recessed portions, each of the second recessed portions is between one of the extension portions and the indentation portion, and the second recessed portions correspond to the power terminals; the second recessed portions are recessed toward the base portion; an end portion of each of the power terminals at one of the two faces of the tongue portion faces an end portion of a corresponding one of the power terminals at the other face of the tongue portion through a corresponding one of the second recessed portions.

13. The electrical receptacle connector according to claim 5, wherein the metallic plate has second recessed portions, each of the second recessed portions is between one of the at least one of the extension portions and the at least one of indentation portion, or between the extension portions, and the second recessed portions correspond to the power terminals; the second recessed portions are recessed toward the base portion; an end portion of each of the power terminals at one of the two faces of the tongue portion faces an end portion of a corresponding one of the power terminals at the other face of the tongue portion through a corresponding one of the second recessed portions.

* * * * *